Sept. 12, 1944.   G. A. ROBERTS   2,357,974
VISOR
Filed July 13, 1939
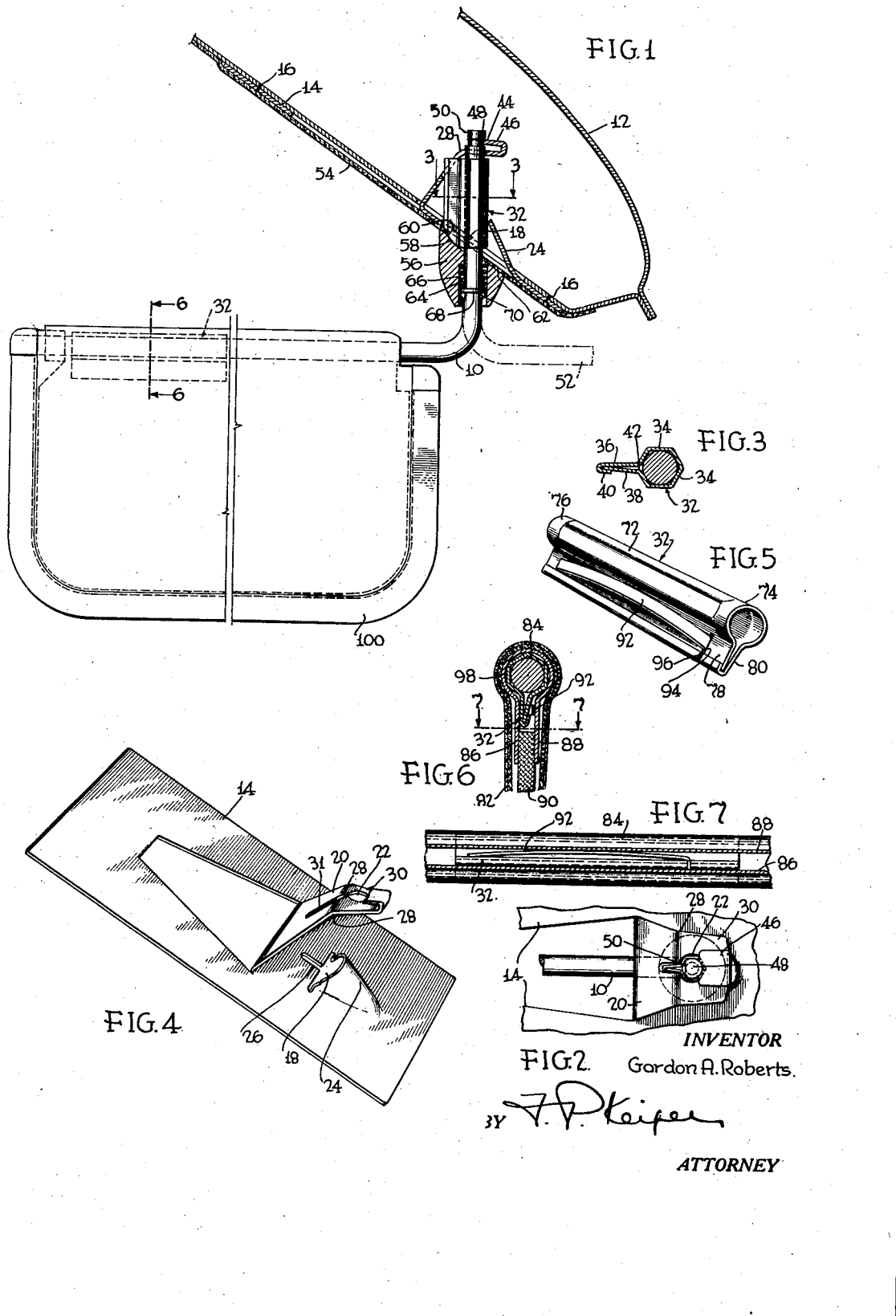
INVENTOR
Gordon A. Roberts.
BY F. P. Keiper
ATTORNEY Patented Sept. 12, 1944

2,357,974

UNITED STATES PATENT OFFICE 2,357,974

VISOR

Gordon A. Roberts, Grosse Pointe, Mich.

Application July 13, 1939, Serial No. 284,177

17 Claims. (Cl. 248—289)

This invention relates to visors adapted for automotive vehicle use and more particularly to an improved friction swivel adapted for use in conjunction both with the visor frame and the support therefor.

In visors adapted for automotive vehicle use it is necessary to provide a support therefor which may be readily adjustable and which will retain any adjustment effected regardless of vibration. It is also necessary that such friction devices as may be employed for holding a visor in a certain adjusted position be also capable of resisting wear over a long period of years, and in addition they must retain their uniform action during such period.

It is an object of the present invention to provide an improved friction swivel adapted for use in a visor either between the visor and a support rod or in a swivel of the support rod in its bracket.

It is another object of the invention to provide a friction swivel constituted by a polygonal sleeve adapted to rest either within the visor frame or a novel support bracket adapted for association with a visor supporting arm.

The above and other novel features of the invention will appear more fully hereinafter from the following detailed description when taken in conjunction with the accompanying drawing. It is expressly understood, however, that the drawing is employed for purposes of illustration only and is not designed as a definition of the limits of the invention, reference being had for this purpose to the appended claims.

In the drawing, wherein similar reference characters refer to similar parts throughout the several views:

Figure 1 is a transverse section through a support bracket with parts in elevation illustrating an application of the friction sleeve of the invention.

Figure 2 is a top plan view of Figure 1.

Figure 3 is a section taken on line 3—3 of Figure 1.

Figure 4 is a perspective view of the bracket plate of Figure 1.

Figure 5 is a perspective view of a friction sleeve embodying the invention adapted for use within a visor frame.

Figure 6 is a section taken on the line 6—6 of Figure 1 through the visor and

Figure 7 is a section taken on the line 7—7 of Figure 6.

Referring to Figures 1, 2 and 3, there will be seen a visor support rod 10 swivelly mounted in the roof structure 12 of an automotive vehicle. The roof structure shown is the front header of an automotive vehicle above the windshield thereof. To form the swivel, there is provided a bracket plate 14 adapted to be secured to the vehicle frame structure in any preferred manner as by welds 16. The plate is provided with an aperture 18 and a struck-in bracket 20 having an aperture 22 therein adapted to align with the aperture 18 to form a pair of spaced bearings for swivelly supporting the rod 10. The aperture 18 is bounded by a horn 24 depressed in the plate 14 and is also provided with a slot 26 extending radially from the aperture. The bracket 20 in the portion where the aperture 22 is positioned is bent as at 28 to form a portion 30 more or less transverse to the axis of the rod 10, and the aperture 22 is provided with a radially extending slot 31 lying in a plane common to the axis of the rod 10 and the slot 26.

In order to frictionally secure the rod 10 in the apertures 18 and 22 a short sleeve 32 of resilient material bent up to form a hexagonal sleeve with flat sides 34 and radially extending flanges 36 and 38, the flange 36 being provided with a return-bent portion 40 overlying the flange 38 and securing the flanges together along their marginal edges. In order to provide a suitable friction grip between the hexagonal faces 34 and the cylindrical surface of the rod 10, the flanges 36 and 38 are spread apart as at 42 by the insertion of the rod 10 therethrough and thus a smooth frictional grip between the sleeve and the rod is afforded.

The flanges 36 and 38 of the sleeve are so proportioned as to readily extend into the slots 26 and 31 of the support plate and its bracket 20, and the aperture 18 in the support plate is of sufficient diameter to accommodate both the rod 10 and the sleeve 32.

In order to permit assembly and disassembly of the rod and its friction sleeve from the bracket without gaining access behind the support plate and in order to hold the rod in position during normal use thereof, the upper end of the rod is provided with an annular groove 44 which is adapted to engage, in a manner to prevent axial movement, the finger 46 which is the return-bent extremity of the bracket 20, and the shoulder 48 formed by the annular groove 44 is cut away in any preferred position as is indicated at 50. Thus it will appear that, when the rod 10 is turned to the position shown at 52, the cut away portion 50 of the shoulder 48 will freely pass the finger 46 and permit the rod 10 to be axially moved downward out of the bracket 20 and plate 14.

Thus the position indicated by the reference character 52 may be a position in which the visor would not normally be adjusted and in which position the visor could not be adjusted unless, for example, the windshield were opened. It will also appear that the shoulder 48 may be removed at any other particular angle as may be desired; for example the visor may be made removable upon return to a position extending out through an adjacent open doorway, which likewise is a position abnormal to the usual use for which a visor is adapted.

To trim the plate neatly, any suitable covering material 54 may be applied thereto and a boss 56 may be threaded upon the rod 10 as illustrated. The boss preferably would be provided with a slot 58 adapted to engage the cut away corner 60 of the flanges of the sleeve 32 so as to prevent rotation thereof and may also have an inclined face 62 adapted to neatly engage the covering material around the aperture 18. The boss may further be urged into engagement with the covering material 54 and the plate 14 by a spring 64 arranged in a shouldered recess 66 and retained in place upon the rod by a washer 68 and integral projections 70 formed in the rod.

Referring to Figures 1, 5, 6 and 7, there will appear a modification in which the friction sleeve is employed within a visor frame. In this particular modification, the use of the friction sleeve constitutes an improvement over the prior application Serial No. 256,278, filed February 14, 1939, and for the sake of simplicity, such details as are disclosed in this prior application and are not pertinent to the improvement herein have been omitted.

Referring to this modification, it will appear that the horizontal portion of the rod 10 is provided at its extreme end with a friction sleeve having a hexagonal center portion 72 and rounded end portions 74 and 76. A sleeve is also provided with radially extending flanges 78 and 80, the latter of which is return-bent around the flange 78 in order to hold the flanges together. The friction sleeve is adapted to rest within a frame member 82 of the visor, which frame member has a circular portion 84 adapted to surround the sleeve and spaced apart flanges 86 and 88 between which may be arranged a stiff visor board 90. In the space between the flanges 86 and 88, the flanges 78 and 80 of the friction sleeve extend and in order to provide a light frictional engagement between the sleeve and visor frame so as to permit axial movement of the visor frame along the rod 10, a light leaf friction spring 92 is provided, the same being secured in place in the flanges 78 and 80 through a bent end 94 extending in a slot 96 in the flanges 78 and 80. The light resilient contact of the spring 92 against the flange 88 of the frame member 82 frictionally prevents sliding movement of the visor upon the rod 10 except as is desired by manual operation. It will readily appear that the visor may be completed by any suitable covering means 98 and binding 100, which parts, however, do not form a part of the present improvement.

It will readily appear from the foregoing that the visor and rod 10 may be assembled as a unit and inserted into the bracket in some position abnormal to the usual use of the visor in daily operation and thereafter given a twist to engage the discontinuous shoulder 48 with the finger 46 to retain the same in place. Thus assembly of the visor in a finished automotive vehicle is considerably facilitated and the use of screws and other complicated fastening means is completely avoided. It will be seen that the friction sleeve thereby provides a smooth friction grip both between the visor and the rod and its supporting bracket which readily permits manual operation but resists movement otherwise.

Though several modifications of the invention have been illustrated and described, it is to be understood that the invention is not limited thereto, but may be embodied in various mechanical forms and arrangements. As various changes in construction and form may be made without departing from the spirit of the invention, as will be apparent to those skilled in the art, reference being had to the appended claims for a definition of the limits of the invention.

What I claim is:

1. In a swivel support for a visor, a plate having an aperture therethrough, a radial slot in said plate extending from said aperture, a visor support rod extending through said aperture and adapted to swivel relative to said plate, and a resilient friction sleeve frictionally embracing said rod, and having a radial rib extending into said slot to prevent relative rotation between said sleeve and plate.

2. In a swivel support for a rod, a plate having an aperture therethrough and a struck-in integral bracket bent back from said plate at an angle to said plate and adjacent said aperture, said bracket having a portion thereof apertured and bent to receive a rod projecting through said plate aperture.

3. In a swivel support, in combination a plate having an aperture therethrough and a struck-in integral bracket bent back from said plate at an angle to said plate and adjacent said aperture, said bracket hving a portion thereof apertured and bent to receive a rod projecting through said plate aperture, and a swivel rod extending through both apertures.

4. In a swivel support, in combination a plate having an aperture therethrough and a struck-in integral bracket bent back from said plate at an angle to said plate and adjacent said aperture, said bracket having a portion thereof apertured and bent to receive a rod projected through said plate aperture, at least one of said apertures having a radial slot extending therefrom, a friction means extending through at least one of said apertures and having a radial rib extending in said radial slot, and a support rod passing through said apertures and in engagement with said means.

5. In a swivel support, in combination a plate having an aperture therethrough and a struck-in integral bracket bent back from said plate at an angle to said plate and adjacent said aperture, said bracket having a portion thereof apertured and bent to receive a rod projected through said plate aperture, at least one of said apertures having a radial slot extending therefrom, a support rod extending through both apertures, and friction means adapted to engage said rod and extend into said radial slot.

6. In a swivel support, in combination a plate having an aperture therethrough and a struck-in integral bracket bent back from said plate at an angle to said plate and adjacent said aperture, said bracket having a portion thereof apertured and bent to receive a rod projected through said plate aperture, each of said apertures having a radial slot extending therefrom in substantially the same direction, a friction sleeve extending through each aperture, and having a rib thereon extending into both slots and a swivel support rod extending through and frictionally embraced by said sleeve.

7. In a swivel support, in combination a plate having an aperture therethrough and a struck-in integral bracket bent back from said plate at an angle to said plate and adjacent said aperture, said bracket having a portion thereof apertured and bent to receive a rod projected through said plate aperture, each of said apertures having a radial slot extending therefrom in substantially the same direction, a friction sleeve extending through each aperture, and having a rib thereon extending into both slots, a swivel support rod extending through and frictionally embraced by said sleeve and an ornamental knob threaded upon said rod and having a radial slot adapted to engage said rib.

8. In a swivel support, in combination a plate having an aperture therethrough and a struck-in integral bracket bent back from said plate at an angle to said plate and adjacent said aperture, said bracket having a portion thereof apertured and bent to receive a rod projected through said plate aperture, a swivel rod extending through both apertures, said rod having an annular groove therein adjacent one end thereof and adapted to be positioned adjacent one of said apertures, and a finger formed integral with the plate adapted to extend into said groove to prevent axial movement of said rod in said apertures.

9. In a swivel support, in combination a plate having an aperture therethrough and a struck-in integral bracket bent back from said plate at an angle to said plate and adjacent said aperture, said bracket having a portion thereof apertured and bent to receive a rod projected through said plate aperture, a swivel rod extending through both apertures, said rod having an annular groove therein adjacent one end thereof and adapted to be positioned adjacent one of said apertures, and a finger formed integral with the plate adapted to extend into said groove to prevent axial movement of said rod in said apertures, said rod having a portion of the metal removed on one side between said groove and the adjacent end to substantially the depth of said groove to permit said finger to pass out of said groove upon axial movement of said rod through the aperture when in one position.

10. A swivel support comprising a support bracket, a support rod having a swivel part, extending into and swivelly mounted in said bracket, and a portion extending radially outward from the axis of said swivel part, and means for securing said swivel part and bracket against relative axial movement and disassembly except in one relative angular position.

11. In a motor vehicle visor swivel support, a bracket, a visor support rod having a part swivelled in said bracket, and a portion extending at an angle thereto, and means for preventing disassembly of said swivelled part and said bracket in all normal positions of use of said extending portion, said means being adapted for disassembly of said swivelled part from said bracket by relative axial movement therebetween, when said extending portion is swivelled to an abnormal position out of the range of ordinary visor use.

12. In combination, a friction sleeve, a visor support rod extending therethrough, said sleeve being resilient and hexagonal in cross section and having radially extending adjacent flanges of a width at least as great as the radius of said rod, one of said flanges having a reversely bent portion embracing the other flange and means rotatable with respect to said rod having an aperture therein of keyhole configuration threaded over said sleeve and adapted to engage said flanges.

13. A friction sleeve for frictional engagement with a rod comprising a polygonal sleeve of resilient sheet material providing chordal facets adapted to resiliently engage a rod along their medians, and having radially extending side flanges extending substantially from one of the corners of said polygonal sleeve a distance at least as great as the radius of the sleeve, one of said flanges having a reverse bend along the edge thereof embracing the other flange said flanges being of a radial length sufficient to provide a key and being secured together only along the said edge thereof.

14. A friction sleeve for frictional engagement with a rod comprising a sleeve having circular end portions and a polygonal central portion and composed of resilient material providing chordal facets adapted to resiliently engage a rod of lesser diameter than said circular end portions along the facet medians, said sleeve having radial flanges, one of which is provided with a reverse bend embracing the other.

15. In combination, a swivel rod having a circular cross section, a resilient friction sleeve closely embracing said rod and having a polygonal cross section and radially extending adjacent flanges secured together by a return bent portion of one embracing the other, and means to support said rod and sleeve, and having means embracing at least a portion of said flanges to prevent relative rotation between the support means and the sleeve.

16. A visor for a vehicle comprising a support bracket, a visor support arm swively mounted in said bracket, a visor on said arm, and means for securing said visor support arm in said bracket in all normal positions of use for said visor, said means being adapted to release said visor support arm from said bracket when swung to an abnormal position out of the range of said normal positions of use of said visor.

17. A visor for a vehicle comprising a support bracket, a visor support arm pivotally mounted in said bracket and carrying a visor thereon, said arm being adapted to swing through a range of normal positions and at least one abnormal position, and means for securing said arm in said bracket and against relative axial movement with respect to said bracket through the range of normal positions and for permitting relative axial movement for releasing said arm from the bracket when swung to the abnormal position.

GORDON A. ROBERTS.